Sept. 9, 1969      A. H. ORR      3,465,988
AERODYNAMIC LIFT PRODUCING DEVICES
Filed July 31, 1967
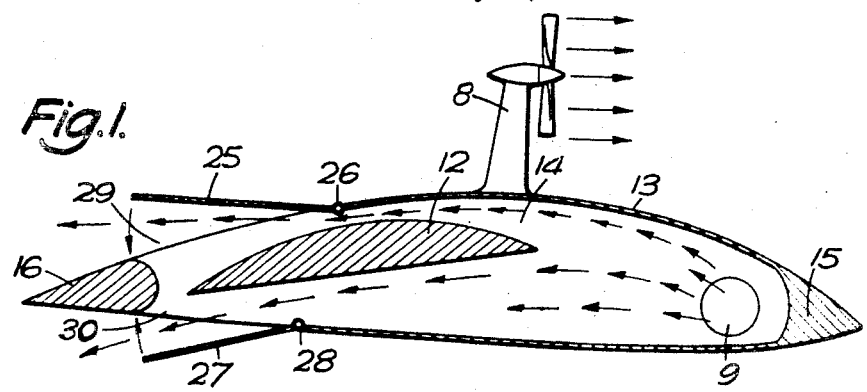
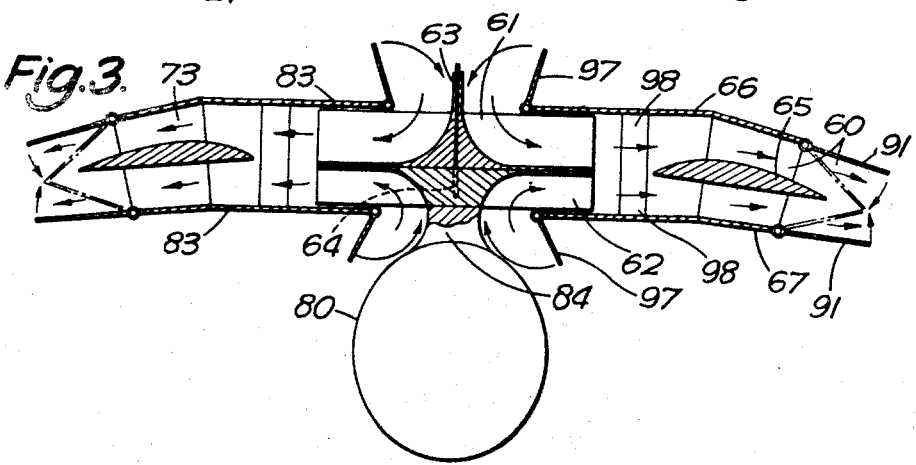
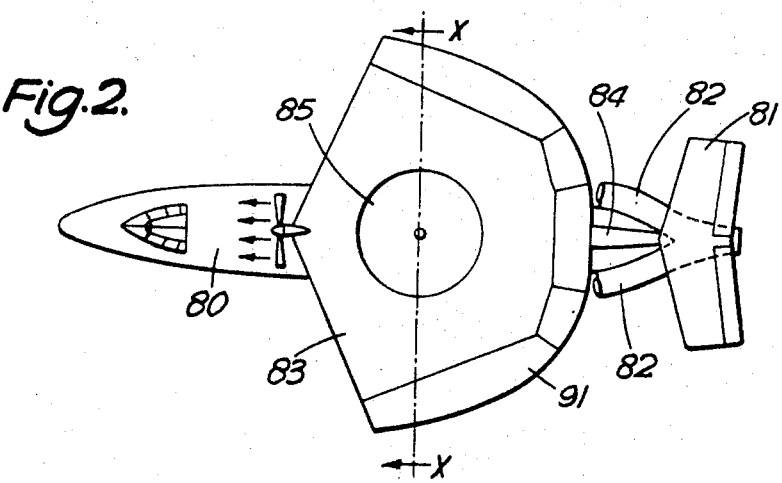
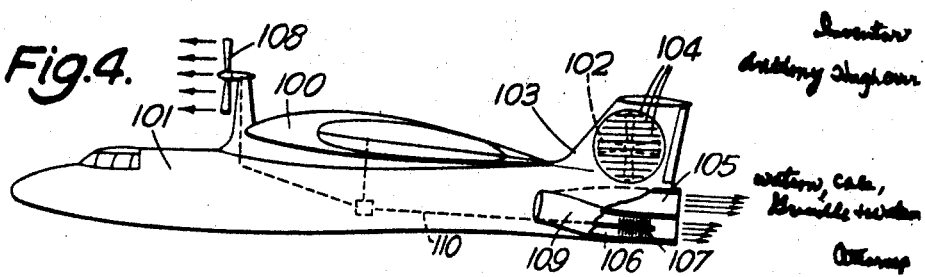

United States Patent Office 3,465,988
Patented Sept. 9, 1969

3,465,988
AERODYNAMIC LIFT PRODUCING DEVICES
Anthony Hugh Orr, 395 Wandsworth Road,
London SW. 8, England
Filed July 31, 1967, Ser. No. 657,173
Claims priority, application Great Britain, Aug. 2, 1966,
34,545/66; Mar. 14, 1967, 11,977/67
Int. Cl. B64c 3/14, 21/02
U.S. Cl. 244—12                                    13 Claims

ABSTRACT OF THE DISCLOSURE

A device to utilize the lift developed by a static aerofoil when a fast moving flow of air is passed over the surface of the aerofoil whilst the aerofoil is partially enclosed in a casing, and having a reverse thrust device arranged to counteract the thrust of air emitted from the casing after passing over the surface of the aerofoil.

---

The invention relates to a device enabling a heavier than air machine to be lifted off the ground vertically without other external assistance, whilst remaining stationary in respect of forward or backward movement, and to aircraft incorporating such a device.

The invention is concerned with a device to utilize the lift developed by a static aerofoil when a fast moving flow of fluid is passed over its surface whilst the aerofoil remains positioned within a casing.

In one of its aspects the invention provides a semi-annular aerofoil or multiple aerofoils, a rigid non-porous casing of semi-annular planform having its forward part sealed, having in section the external shape of a wing section and arranged to surround the aerofoil or a part thereof, a duct between the aerofoil and the casing, means to direct a fluid along the duct over the aerofoil, and means operable (e.g. at will) to counteract the thrust of the fluid direction means and/or the fluid leaving the duct.

The flow of fluid is directed in such a manner that, as it passes over the aerofoil and out of the duct, it creates the maximum lift due to suction and deflection.

Preferably the rigid non-porous casing has the external form of a conventional airplane wing, and there is a discharge opening around at least a part of the periphery of the wing, through which opening fluid may be discharged after passing over the aerofoil.

It is preferred that the edges of the aerofoil nearest the discharge opening, and the discharge opening, are angled downwardly with respect to the surfaces of the wing.

It is further preferred that there is means to restrict or close at least a part of said discharge opening.

The means to direct fluid along the duct is preferably a centrifugal fan or radial impeller mounted for rotation within the duct and in a plane generally parallel to the plane of the wing, and there is a fluid inlet in a part of the casing corresponding to a wing surface, means to drive the fan or impeller, and means to react the drive torque applied to the fan or impeller.

In one form of the invention the means to react the torque is a second fan or impeller arranged coaxially with, and for rotation in the opposite sense to the first fan or impeller, and in this form both fans may be driven from a common drive shaft.

Preferably an intake for the second fan or impeller is disposed in a wing surface opposed to the wing surface aforesaid.

In an alternative form of the invention the means to react the drive torque is a torque balance propeller arranged to direct a stream of air in a direction which has a component tangential to the periphery of the fan or impeller, and in this form the torque balance propeller is disposed in a plane of symmetry with respect to the wing, and is rotatable about an axis perpendicular to said plane. Preferably there is means to blank off the torque balance propeller.

There may be vanes adjacent to and surrounding the fan(s) or impeller(s), which vanes are adapted to direct the fluid flow radially away from said fan(s) or impeller(s).

The invention includes the arrangements described above in combination with a conventional aircraft fuselage, empennage and propulsion unit, in which the fuselage is mounted beneath the line of symmetry of the wing.

In this form there are shutter means to blank off the inlets to the fan(s) or impeller(s).

Specific embodiments of the invention will now be described with reference to the accompanying drawings of which:

FIGURE 1 is a diagrammatic sectional view of an aircraft wing,

FIGURE 2 is a plan of an aircraft illustrating a second embodiment of the invention.

FIGURE 3 is a cross-section on the line XX in FIGURE 2, and

FIGURE 4 is a side elevation of an aircraft illustrating a third embodiment.

A wing (shown in FIGURE 1) consists of an aerofoil 12 shaped similarly to a conventional aeroplane wing, and a rigid non-porous casing 13 surrounding the aerofoil 12. The casing 13 is shaped to follow the contours of the aerofoil, and there is within the wing a duct 14 defined by the outer surface of the aerofoil and the inner surface of the casing. The casing has stiffened leading and trailing edges 15 and 16 respectively.

As shown in FIGURE 1 the wing has upper and lower flaps 25 and 27 near to the trailing edge 16 of the casing. The flaps are mounted on hinges 26 and 28 at their ends away from the trailing edge, and are capable of limited rotational movement away from each other, so to provide outlets 29 and 30 from the duct 14.

The embodiment described above is intended to illustrate the principle of the invention. Air is blown through a passage 9 into the casing 13, passes between the casing 13 and the aerofoil 12 on either side of the aerofoil, and is discharged through outlets 29 and 30. Lift is developed on the aerofoil 12 when a fast moving flow of air is passed over its surface. In this embodiment a separate propulsion unit 8 is attached to the casing 13 to counteract the thrust of air omitted through the outlets 29 and 30.

The aircraft shown in FIGURES 2 and 3 has a conventional fuselage 80, a conventional empennage 81 and rear mounted propulsion jets 82. Following the invention the aircraft has a casing 83 shaped to form a wing, and mounted above the fuselage 80 on a pylon 84. The pylon extends along a greater part of the length of the top centre line of the fuselage. The casing encloses an aerofoil 65 and is disposed around two centrifugal fans which are mounted on shafts 63 and 64. In this form the aerofoil extends beyond the casing 83. At its outer edges the casing and the aerofoil are angled downwardly to direct the airflow downwards. The aerofoil may have "high lift" devices at its leading and trailing edges.

The two gas turbine engines 82 are disposed symmetrically about the centre line of the aircraft and have their intakes angled slightly away from one another. As illustrated in FIGURE 4 the engines lead to a duct 109 arranged to enclose the engine exhaust gases. The duct is split into two passages one of which passages 105 serves as a jet exhaust nozzle, and the other of which passage 106 leads to a turbine 107 arranged to drive the shafts 63 and 64. Mounted on the fuselage there are propellers 108 driven from the turbine 107 through a shaft 110 which shaft also drives the fans and an anti-torque device if applicable.

FIGURE 3 shows in section the generally wing shaped casing formed by a generally annular duct 60 which duct is open at its edges nearest and furthest away from the centre of the annulus. Within the space defined by the inner edges of the duct 60 there are two centrifugal fans 61 and 62 attached to concentric shafts 63 and 64 respectively, which shafts are disposed on the axis of the circular body. The centrifugal fans or radial impellers 61 and 62 are arranged to draw air respectively from above and below the body and to eject it radially through the duct 60.

Within the duct 60 is the aerofoil member 65 which is supported between upper and lower surfaces of the ducts, which surfaces are designated 66 and 67 respectively. At the inner edge of the aerofoil there are vanes 98 adapted to guide the flow of air from the impellers so that the air meets the leading edge of the aerofoil normally. There is an annular gap between the impellers and the vanes. The vanes opposite the upper and lower impellers face in opposite directions and are separated by a plate.

In use the gas turbine engines are utilized to supply energizing gas to the turbine 107 so to drive the fans 61 and 62 through the shafts 63 and 64.

Air driven outwards by the fans passes around the aerofoil 65 so producing lift on the aerofoil. Air passing through the duct may be used to provide thrust for directional movement. The lift and thrust may be derived from engines of a suitable configuration which may or may not be coupled together.

There are five flaps 91 adapted to close at will selected parts of the outlet area of the casing 83, and so to create some measure of directional control. While the aircraft has little forward motion the propellers aforesaid or efflux from the jet engines directed to give reverse thrust, are used to oppose the thrust produced by the air issuing from the flaps 91 in a rearward direction.

When the aircraft has sufficient forward speed the flaps 91 are closed and the aircraft flies using the exterior surface of the casing as a conventional wing. In this mode of operation the engines 82 are used to provide forward thrust, through the duct 105, and there are shutters 97 which are adapted to cover the fan inlets, so to provide a smooth outer surface to the wing. These shutters may be attached to the wing structure by chordwire hinges.

In FIGURE 4 a casing 100 is attached to the uppermost part of a fuselage 101. Within the casing there is an annular duct arrangement similar to that illustrated in FIGURE 3, but in this case there is only one centrifugal fan or radial impeller which draws air from the upper and lower surfaces of the casing. The driving torque for the fan or impeller is reacted by a torque balance propeller 102 mounted within the fin 103 of the aircraft, which torque balance propeller rotates in the plane of symmetry of the aircraft. There are louvres or doors 104 on either side of the fin, which louvres or doors may be adjusted to lie either in positions in which they are closed so to blank off the torque balance propeller 102, or open, so to permit air to flow through the fin 103 as the propeller rotates.

I claim:
1. An aerofoil, a generally flat rigid nonporous casing having in vertical section the external shape of a wing section with an outlet for fluid at its rear, and arranged to surround at least a greater part of the upper and lower surfaces of the aerofoil, means supporting said aerofoil in a predetermined position in said casing, an inlet for fluid, ducts between the upper and lower surfaces of the aerofoils and the casing, fluid energizing means to direct a fluid from the inlet to the outlet along the ducts over and under the aerofoil, and a reverse thrust device distinct from the fluid energizing means and operable to counteract the thrust of the fluid leaving the ducts rearwardly.

2. A semi-annular aerofoil, a generally flat rigid nonporous casing of generally semi-annular planform having its forward part sealed and in vertical section the external shape of a wing section with an outlet for fluid at its rear, and arranged to surround at least a greater part of the upper and lower surfaces of the aerofoil, means supporting said aerofoil in a predetermined position in said casing, an inlet for fluid, ducts between the upper and lower surfaces of the aerofoil and the casing, fluid energizing means to direct a fluid from the inlet to the outlet along the ducts over and under the aerofoil, and a reverse thrust device operable to counteract the thrust of the fluid leaving the duct rearwardly in which there is a discharge opening around at least a part of the periphery of the wing, through which opening fluid is discharged after passing over and under the aerofoil.

3. An arrangement as claimed in claim 2 in which the edges of the aerofoil nearest the discharge opening, and the discharge opening itself, are angled downwardly with respect to the surfaces of the wing.

4. An arrangement as claimed in claim 2 in which there are flaps to restrict at least a part of said discharge opening.

5. An arrangement as claimed in claim 2 in which there are two fluid energizing means each of which is arranged to counteract the rotation of the other.

6. An arrangement as claimed in claim 2 in which the fluid energizing means comprise a centrifugal impeller mounted for rotation within the duct and in a plane generally parallel to the plane of the wing, and in which there is a fluid inlet in a part of one of the wing surfaces of the casing, means to drive the impeller, and torque balance means to react the drive torque applied to the impeller.

7. An arrangement as claimed in claim 6 in which the torque balance means is a second impeller arranged coaxially with, and for rotation in the opposite sense to, the first impeller, both impellers being driven from a common drive shaft and in which there are vanes adjacent to and surrounding each impeller, which vanes are adapted to direct the fluid flow radially away from the respective impeller.

8. An arrangement as claimed in claim 7 in which an intake for the second impeller is disposed in a wing surface opposed to the wing surface aforesaid.

9. An arrangement as claimed in claim 8 in which there are shutter means to blank off the inlet to each impeller.

10. An arrangement as claimed in claim 9 in which the torque balance means is a torque balance propeller disposed in the plane of symmetry of the wing, and rotatable about an axis perpendicular to said plane.

11. An arrangement as claimed in claim 10 in which there is shuttering to blank off the torque balance propeller.

12. An arrangement as claimed in claim 2 in combination with a conventional aircraft fuselage, empennage and propulsion unit, in which the fuselage is mounted with its center line beneath the line of symmetry of the wing.

13. An aircraft having:
 (a) a conventional aircraft fuselage, empennage and propulsion unit,
 (b) a wing comprising a rigid nonporous casing and having an internal configuration of a truncated annular duct,
 (c) means to connect the said casing to the fuselage with the line of symmetry of the wing above the center line of the fuselage,
 (d) at least one aerofoil part disposed within the said casing which aerofoil part extends around the said duct, dividing it into portions above and below the aerofoil part,
 (e) means to support the aerofoil part within the said duct,
 (f) an impeller arranged to draw air into the duct and to direct the air outwardly over and under the aerofoil part, (g) means to support the impeller with respect to the said casing,
(h) means to drive the impeller,
(i) a discharge opening disposed around a part of the periphery of the casing, through which opening fluid is discharged after passing over the aerofoil part,
(j) flaps to restrict at least a part of the discharge opening,
(k) a reverse thrust device operable to counteract the thrust of the impeller and hence the thrust of the air leaving the duct through the discharge opening, and
(l) torque balance means to react the drive torque applied to the impeller.

References Cited
UNITED STATES PATENTS

| | | | |
|---|---|---|---|
| 2,997,254 | 8/1961 | Mulgrave | 244—12 |
| 3,034,747 | 5/1962 | Lent | 244—23 |
| 3,073,551 | 1/1963 | Bowersox | 244—23 |
| 3,116,036 | 12/1963 | Nichols | 244—17.19 X |
| 3,179,353 | 4/1965 | Peterson | 244—12 |

MILTON BUCHLER, Primary Examiner

THOMAS W. BUCKMAN, Assistant Examiner

U.S. Cl. X.R.

244—35, 45